3 Sheets—Sheet 1.

J. L. HASTINGS.
Cotton Picker.

No. 243,132. Patented June 21, 1881.

Attest:
H. W. Brecher
L. K. Munn

Inventor;
James Lance Hastings
per Edw. Dummer,
Atty.

N. PETERS. Photo-Lithographer, Washington, D. C.

3 Sheets—Sheet 2.

J. L. HASTINGS.
Cotton Picker.

No. 243,132. Patented June 21, 1881.

Attest:
H. W. Bricker.
L. K. Munn.

Inventor:
James Lance Hastings.
per Edw. Dummer,
Atty.

3 Sheets—Sheet 3.

J. L. HASTINGS.
Cotton Picker.

No. 243,132. Patented June 21, 1881.

Attest:
H. W. Brecher.
L. K. Munn.

Inventor:
James Lance Hastings.
per Edw. Dummer,
Atty.

UNITED STATES PATENT OFFICE.

JAMES L. HASTINGS, OF NEW ORLEANS, LOUISIANA, ASSIGNOR TO BERNHARD WELKER, CONRAD REITER, BERNHARD KRUGH, HUGH LAFFERTY, AND WILLIAM B. HOLLIS, IN TRUST FOR HASTINGS COTTON PICKER MANUFACTURING COMPANY.

COTTON-PICKER.

SPECIFICATION forming part of Letters Patent No. 243,132, dated June 21, 1881.

Application filed June 14, 1878.

*To all whom it may concern:*

Be it known that I, JAMES LANCE HASTINGS, of New Orleans, in the parish of Orleans and State of Louisiana, have invented a new and useful Improvement in Pickers for Machines for Picking Cotton from the Plant, which improvement is fully set forth in the following specification, reference being had to the accompanying drawings.

My invention relates to a picker to be used in a machine for picking cotton from the plant; and it consists, first, in a picker which has several spurs or fingers that may be thrust outward from the body of the picker, while in the plant, to enlarge its picking-surface and facilitate gathering the cotton without injury to the plant, the fingers being withdrawn to the body of the picker for the easy ingress and egress of the picker into and out of the plant; secondly, in revolving each of these spurs or fingers while in the plant to gather the cotton most successfully; thirdly, in hooks or points on these spurs or fingers so formed as to collect the cotton without injury to the plant; fourthly, in spurs or fingers having flexible stems or shafts, whereby they may be thrust outward in the directions desired, and at the same time be revolved; fifthly, in mechanism by which the movement of thrusting the picker into the plant may be employed to thrust out the spurs or fingers, and thus expand the picker; sixthly, in mechanism by which the revolution of the spurs or fingers may be effected.

Figure 1:
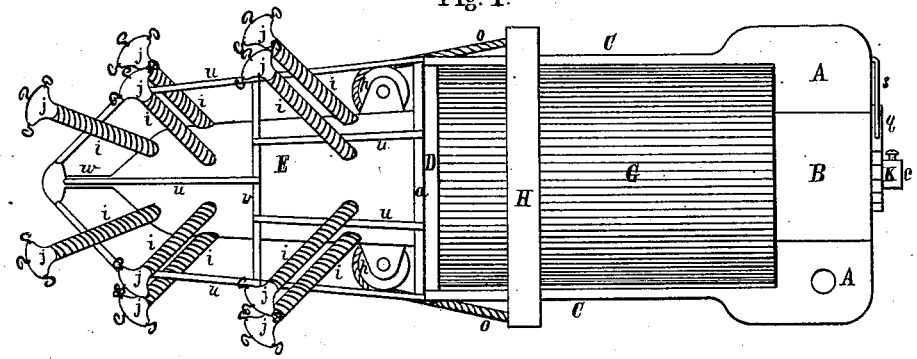
Figure 2:
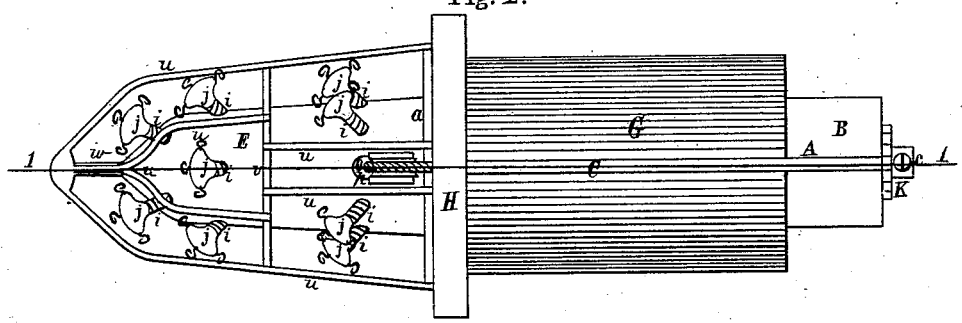
Figure 3:
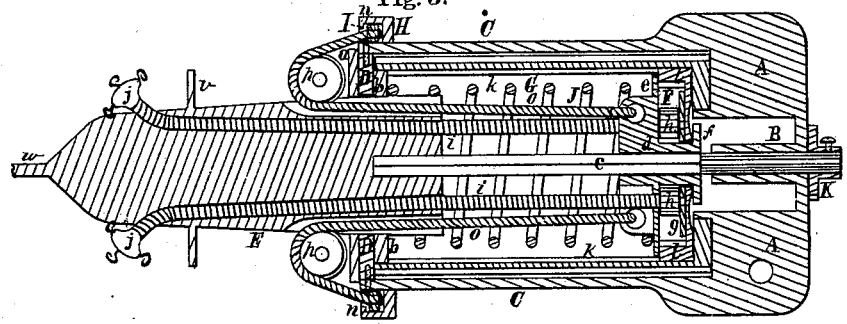
Figure 4:
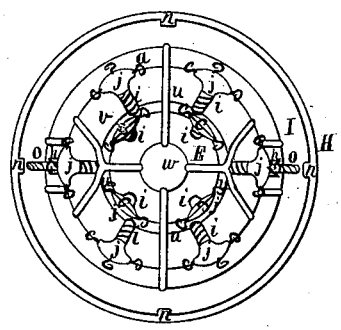
Figure 5:
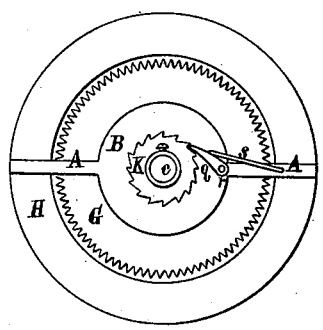
Figure 6:
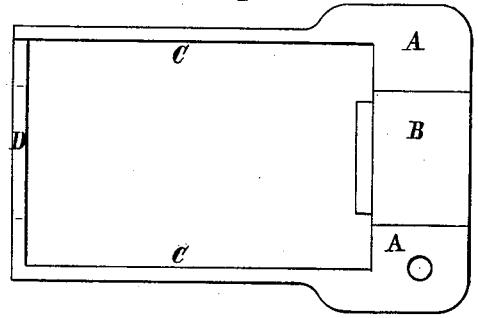
Figure 9:
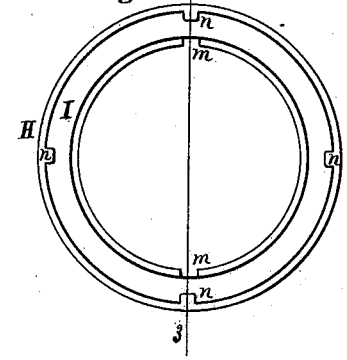
Figure 7:
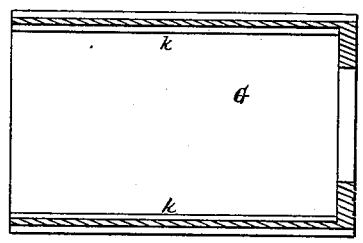
Figure 8:
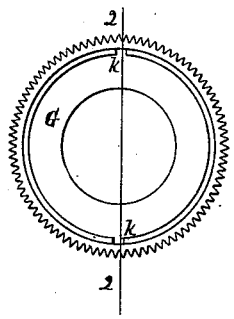
Figure 10:
Figure 11:
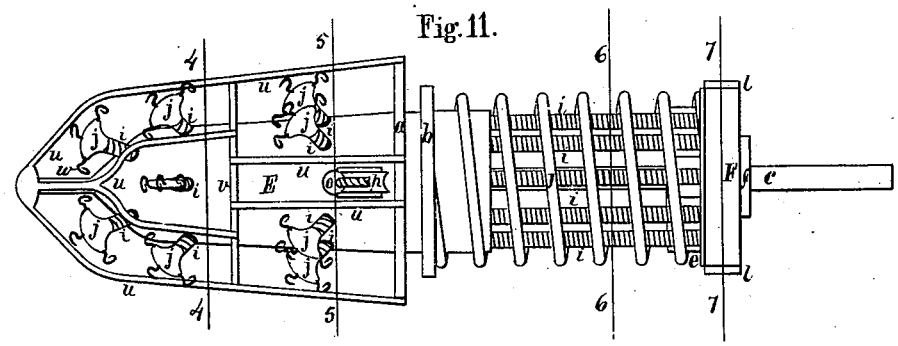
Figure 12:
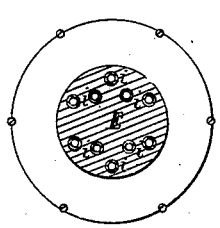
Figure 13:
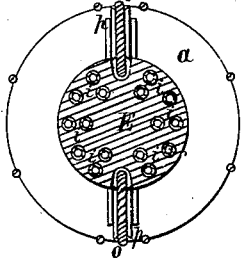
Figure 14:
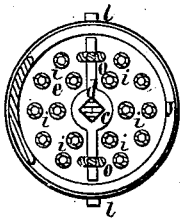
Figure 15:
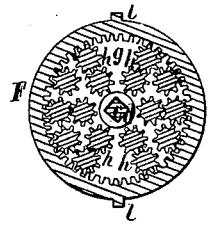
Figure 16:
Figure 17:

In the drawings, Figure 1 is a side view of a picker embodying my invention, showing the spurs or fingers as thrust part way out. Fig. 2 is a side view of the same picker turned one-quarter way around from the position in Fig. 1, but shows the spurs or fingers drawn inward to the body of the picker. Fig. 3 is a longitudinal section taken on line 1 1 of Fig. 2, but shows only two of the spurs or fingers and their stems or shafts, and has the guards broken away. Fig. 4 is a head end view, and Fig. 5 a rear end view, of the picker. Fig. 6 is a side view of the outer or supporting frame. Fig. 7 is a longitudinal section of the fluted cylinder or external gear, taken on line 2 2 in Fig. 8, which is an end view of said cylinder or gear. Fig. 9 is a face view of the rings H and I, and Fig. 10 is a section of these rings, taken on line 3 3 in Fig. 9. Fig. 11 is a side view of the picker, having the supporting-frame and fluted cylinder or external gear removed. Figs. 12, 13, 14, and 15 are transverse sections taken on lines 4 4, 5 5, 6 6, and 7 7 in Fig. 11, respectively. Figs. 16 and 17 are views of two different forms of the spurs or fingers with their flexible stems or shafts.

The picker is supported by the flanges A or other suitable extensions, which are attached to the working rods or arms of the machine. (Not here shown.) The movement of said rods or arms is such that the picker is thrust endwise into the plant, and held there without having any considerable sidewise movement in the plant while the machine moves forward a certain distance, the picker thereupon being withdrawn endwise from the plant, and afterward carried forward in the machine for a repetition of the operation. The flanges A are joined to the cylindrical part B, and also have connected to them the bars C, which are fastened at their other ends to the ring D. The flanges A, cylinder B, bars C, and ring D may be regarded as the supporting-frame of the picker, which frame may be varied in its form of construction to be adapted to the machine in which it is employed, and which gives to it the movements above specified.

The portion of the picker which enters the plant is the part E, which is supported by the ring D, that is partially inclosed by the flanges *a* and *b* on the part E. This part E is further retained in place by a spindle, *c*, which is fixed concentrically therein, and extends to pass through a bearing in the cylinder B. This spindle *c* is squared, or given other shape, to prevent a revolution thereon of parts fitted thereto, from the part E to the cylinder B. In the cylinder B it is round, so as to revolve therein.

On the spindle *c* is the small cylinder or thimble *d*, which fits the spindle to slide but not revolve thereon. An internal gear, F, is fitted to revolve on the thimble $d$. A disk, $e$, is joined to, as a part of, the thimble $d$, as is also a flange, $f$. The gear F is held in place on the thimble by the disk $e$ and flange $f$. The disk $e$ and a loose plate, $g$, serve to retain in relative position pinions $h$. The outer circle of these pinions $h$ engage with, to be driven by, the internal gear, F, and those of the inner circle engage with, to be driven by, the outer ones. To each of the pinions $h$ is firmly attached a flexible shaft or stem, $i$, which may be formed of wire wound spirally, in the manner of a spiral spring, as shown. The flexible stems or shafts $i$ extend through tubular openings in any suitable directions in the part E, and bear each one at the outer end one of the spurs or fingers $j$.

Outside of the internal gear, F, is a hollow fluted cylinder or external gear, G, which is fitted to the flange $b$ and the cylinder B, so as to revolve thereon. Grooves $k$ are formed longitudinally in the inside of the cylinder or gear G, into which fit so as to slide therein projections $l$, fixed on the outside of the internal gear, F.

Outside of the cylinder or gear G is a ring, H, which is prevented from revolving by recesses $m$ formed therein for the bars C, so that it may slide along these over, but not to bear on, the cylinder or gear G. In a recess in the face of the ring H fits loosely a ring, I, which is held in the recess by projections $n$ on the ring H.

From the ring I extend cords or chains $o$ in the direction shown, being fastened each one at one end to the ring I and at the other end to the disk $e$, passing about pulleys $p$ held in bearings on the part E. A spiral spring, J, is placed outside the flexible shafts $i$ and within the cylinder or gear G, to extend from the flange $b$ to the disk $e$, and, pressing against both, acts to force the internal gear, F, and pinions $h$ away from the part E.

On the outer end of the spindle $c$ is fastened a ratchet-wheel, K, on which acts a pawl, $q$, pivoted at $r$ and pressed to the ratchet-wheel by a spring, $s$.

The fingers $j$ have a central portion, in which are secured hooks $t$, which are bent each one so as to point in the direction in which the fingers are revolved, and that the points shall be a little nearer the central portion of the finger—that is, within the line of curvature of the hooks. I judge the hooks best so formed, and they may in other respects be differently arranged, two ways of arranging them being shown in Figs. 16 and 17. Guards $u$, which may be formed of wires, as here shown, extend outside of the fingers when the latter are drawn to the part E, being fastened to the flanges $a$ and $v$ and at the head of the picker at $w$.

The parts of the picker being constructed and arranged substantially as shown and described, the operation of the same is as follows: When the picker is thrust outward from the machine endwise to enter the plant, bars or their equivalent prevent the ring H from passing out of the machine. This will cause a draft on the cords or chains $o$, and hence the thimble $d$, internal gear, F, and pinions $h$ will be drawn or slid on the spindle $c$ toward the part E, and the flexible shafts $i$, following the directions given by the tubular openings in the part E, will be pushed outward. The fingers $j$ will thus be extended in the directions and for the distance desired beyond the guards $u$. The machine continuing a forward motion, being drawn by a horse or other motive power, a toothed rack suitably arranged on the machine will engage with the fluted cylinder or external gear, G, which will thus be caused to revolve. The revolution of the cylinder or gear G will cause the revolution of the internal gear, F, by means of the projections $l$, and thus the pinions $h$, stems or shafts $i$, and the fingers $j$ will be caused to revolve. The toothed rack is located on the machine in such position relatively to the cylinder or gear G as to cause the revolution of the same, and hence of the internal gear, F, in such direction that the pawl $q$ will engage with the ratchet-wheel K, and by this means, the thimble $d$ also being on the squared or suitably-formed portion of the spindle $c$, not to revolve thereon, the part E will be prevented from revolving. When the picker is withdrawn endwise into the machine the pulleys $p$ will be allowed to move back toward the ring H, and the spring J will cause the thimble $d$, internal gear, F, and pinions $h$ to return to their former position, and the fingers $j$ will be withdrawn beneath the guards $u$ by means of the flexible shafts or stems $i$. After the picker is withdrawn into the machine, moving cleaning-belts come in contact with the part E or the cotton held by the fingers $j$, and, to facilitate gathering the cotton therefrom, revolve the part E; or this revolution may be caused by revolving the cylinder or gear G in the opposite direction from the one mentioned above, this revolution being possible, since the pawl $q$ will slip along the ratchet-wheel K moving in this direction, and the ring I will slide in the recess in the ring H.

The above-described operations will be repeated after the picker has been, by suitable mechanism, carried forward in the machine to the position to be again thrust into the plant.

By this extension of the fingers while the picker is in the plant a larger proportion of cotton will be collected than would otherwise be reached. The flexible shafts will allow and cause the fingers to enter small openings between the leaves and branches and of the opened bolls, and that, too, in so delicate a manner as not to injure the plant, while the revolving of the fingers will insure the gathering of the cotton. The particular form of the hooks on the fingers will enable them to collect the cotton without tearing the leaves or branches, since only fine fibers as those of the cotton will be likely to be reached by the extreme points of the hooks. The guards $u$ will protect the plant from injury by the picker while it is being thrust into the plant.

It will be seen that the details of the picker in form of construction may be varied without changing the essential principles or working of my invention.

I do not herein claim matter shown and described, but not claimed in this case, which has been shown, described, and claimed in previous application filed by me May 28, 1878; but I now claim as my invention—

1. A picker adapted to be attached to a rod or arm of a cotton-harvester, whereby it may be thrust into the plant, and having one or more fingers or spurs, j, which may be thrust outward from the body of the picker, substantially as and for the purpose hereinbefore set forth.

2. In a picker adapted to be attached to a rod or arm of a cotton-harvester, whereby it may be thrust into the plants, the combination of a spur or finger, j, and a flexible stem or shaft, i, with the head or part E, substantially as and for the purpose hereinbefore set forth.

3. The fingers j, having the hooks t, formed or bent to point in the direction of the revolution of and somewhat toward the center of said fingers, substantially as hereinbefore described.

4. In a picker adapted to be attached to a rod or arm of a cotton-harvester, whereby it may be thrust into the plant, the guards u, positioned in reference to and in combination with the head or part E and the fingers j substantially as and for the purpose hereinbefore set forth.

5. In a cotton-harvester, the combination of the fluted cylinder or external gear, G, internal gear, F, pinions h, flexible shafts i, and part E, having openings and bearings for said flexible shafts, substantially as hereinbefore set forth.

6. The combination of the ring I, cords or chains o, disk e, thimble d, and internal gear, F, substantially as and for the purpose hereinbefore set forth.

7. The part E, having tubular openings for the flexible stems or shafts i, substantially as hereinbefore described.

8. In a picker adapted to be attached to a rod or arm of a cotton-harvester, whereby it may be thrust into the plant, the combination of the fluted cylinder or external gear, G, and a gear, F, substantially as hereinbefore set forth.

9. The combination of the flanges A, part B, bars C, and ring D, substantially as hereinbefore described.

10. The combination of the part B, spindle c, ratchet-wheel K, pawl q, and part E, substantially as and for the purpose hereinbefore set forth.

11. The combination of the spindle c, part E, and thimble d in a picker for picking cotton from the plant, substantially as hereinbefore set forth.

12. A picker adapted to be attached to a rod or arm of a cotton-harvester, whereby it may be thrust into the plant, in which one or more fingers or spurs are thrust outward from the body of said picker, substantially as hereinbefore set forth.

JAMES LANCE HASTINGS.

Witnesses:
 EDW. DUMMER,
 FRED. H. LANE.